E. R. WILLIAMS.
DISAPPEARING SIGNAL TARGET AND LIGHT FOR RAILROAD TRACK SWITCHES.
APPLICATION FILED JUNE 29, 1914.
1,139,148.
Patented May 11, 1915.
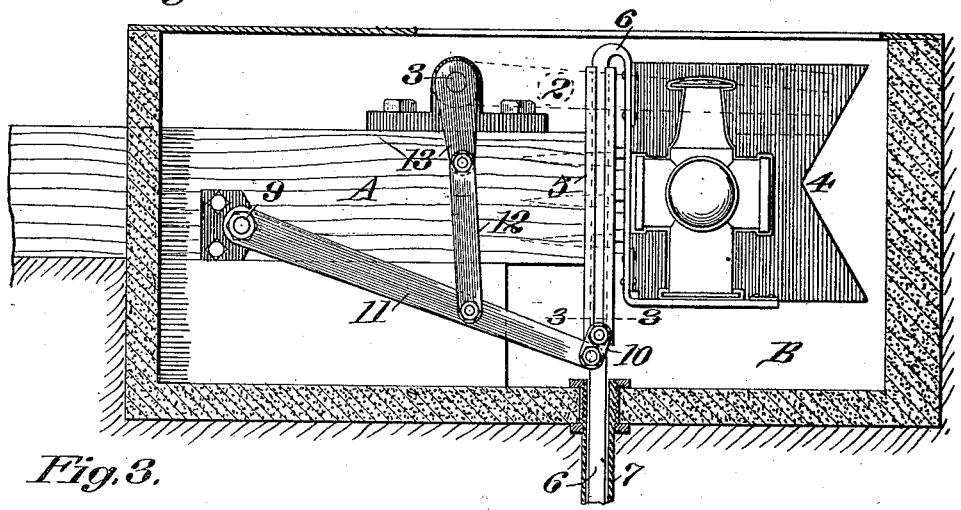
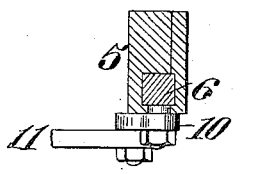
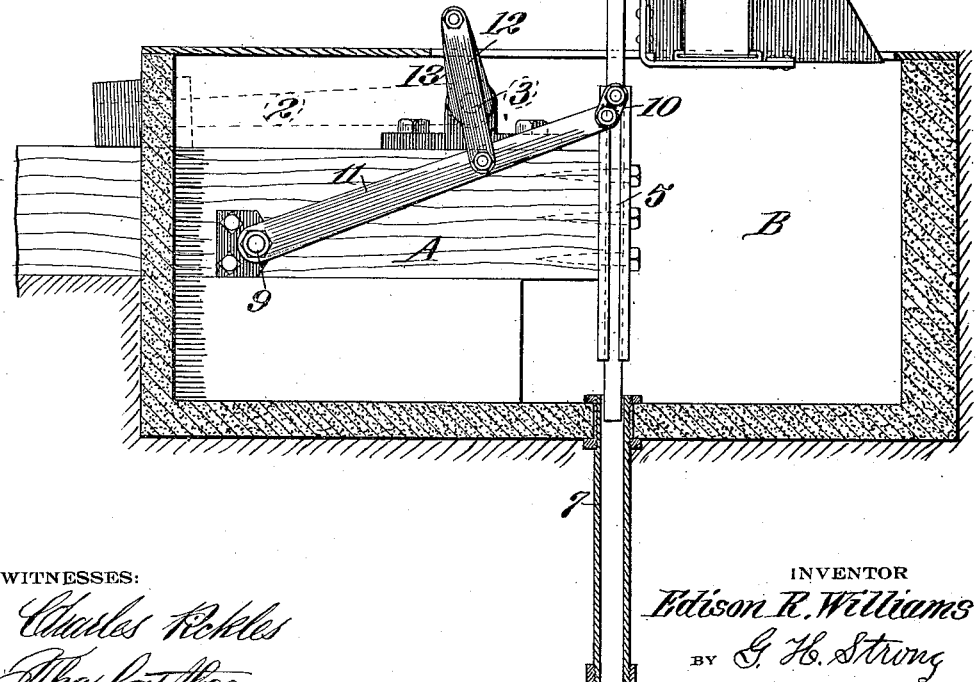
WITNESSES:
INVENTOR
Edison R. Williams
BY G. H. Strong
ATTORNEY
THE NORRIS PETERS CO., PHOTO-LITHO., WASHINGTON, D. C.

UNITED STATES PATENT OFFICE.

EDISON R. WILLIAMS, OF BAKERSFIELD, CALIFORNIA.

DISAPPEARING SIGNAL-TARGET AND LIGHT FOR RAILROAD-TRACK SWITCHES.

1,139,148. Specification of Letters Patent. Patented May 11, 1915.

Application filed June 29, 1914. Serial No. 847,943.

*To all whom it may concern:*

Be it known that I, EDISON R. WILLIAMS, a citizen of the United States, residing at Bakersfield, in the county of Kern and State of California, have invented new and useful Improvements in Disappearing Signal-Targets and Lights for Railway-Track Switches, of which the following is a specification.

The invention relates to a switch light and target connection, so connected to the operating mechanism of a railroad switch that when the switch is not in use the light and target will be below the surface of the ground, and when the switch is in use the light and target will be above the surface of the ground.

The invention consists of the parts and the construction and combination of parts as hereinafter more fully described and claimed, having reference to the accompanying drawings, in which—

Figure 1 is a side elevation showing the signaling device in the lowered position. Fig. 2 is a similar view showing the signal in the raised position. Fig. 3 is a cross section of a guide bracket on line 3—3, Fig. 1.

A indicates the outer end of a switch tie, or other suitable support, for the fulcrum of the usual weighted switch lever 2; 3 the tumbling shaft to which the switch lever 2 is secured; and 4 is the signal-target and light which is designed to be raised or lowered out of or into a box or pit B, according to whether the switch is thrown to open or closed position.

A guide bracket 5 is suitably secured on the outer end of the switch tie A so as to project into the pit B, and 6 is a rod carrying the lamp and target 4, slidably mounted in said bracket, the lower end of which rod may telescope into a tube 7 set into the ground. A lever 11 is pivoted at 9 to the tie, and is connected to the rod 6 through the medium of a short link 10; said lever being operatively connected with the switch lever through a link 12 and a crank arm 13 on the tumbler shaft 3.

The advantage of such a construction is that when a switch is not in use the light and target is below the surface of the ground in a covered box, thus leaving the space clear, and by doing so lessens the hazard of accident. The operation of the switch will cause the light and target to appear above the surface of the ground. It eliminates the many lights that face the engineer when going through a yard, and lessens his confusion and possible accident to train and yardmen.

The materials and finish of the several parts of the signaling device, together with the connection formed between same and the standard switch, may be such as the experience and judgment of the manufacturer may dictate.

Having thus described my invention, what I claim and desire to secure by Letters Patent is—

1. A railway switch signal comprising a housing, a vertically disposed guide member completely inclosed within the housing, a signal carrying rod slidably mounted in the member, and means for reciprocating the rod to raise or lower the signal, said signal when in its lowered position being inclosed by the housing and being located opposite the guide member, and when raised, being projected from the housing and above said member.

2. In a signal, a housing, a signal carrying rod slidable in the housing, a guide for said rod carried by the housing, a horizontal lever pivoted at one end in the housing and having its other end operatively connected to the rod, a crank, and a connection between the crank and the lever at a point intermediate the ends of the lever.

3. A railway switch signal comprising a housing, a tie extending into the housing, a guide member mounted on the inner end of the tie, a signal bearing rod slidably engaged in the member, a lever having one end pivotally connected to the tie and its other end in operative connection with the lower end of the rod, and means for swinging the lever vertically to raise or lower the rod, thereby alternately positioning the connection of the lever and rod at the upper and lower ends, of the guide member.

4. A railway switch signal comprising a housing, a vertically disposed guide member completely inclosed within the housing, a signal carrying rod slidably mounted in the member, a horizontal lever pivoted at one end to a relatively fixed point within the housing, the other end of the lever being in operative connection with the rod, and means pivotally connected intermediate the ends of the lever for swinging the latter to raise or lower the signal bearing rod.

In testimony whereof I have hereunto set my hand in the presence of two subscribing witnesses.

EDISON R. WILLIAMS.

Witnesses:
T. V. HARNEY,
J. A. HERPEL.